INVENTORS.
FRANK SOLOMON
KENNETH N. BROWN
BY
AGENT

United States Patent Office 3,055,964
Patented Sept. 25, 1962

3,055,964
UNI-POTENTIAL SILVER ELECTRODE
Frank Solomon, Great Neck, N.Y., and Kenneth N. Brown, Teaneck, N.J., assignors to Yardney International Corp., New York, N.Y., a corporation of New York
Filed Dec. 17, 1958, Ser. No. 781,090
10 Claims. (Cl. 136—76)

This invention relates to electrochemical batteries and more particularly to positive electrodes for such batteries wherein the active material is silver and its oxides.

Alkaline batteries employing silver positives, e.g. in combination with negative plates containing zinc or cadmium as an active material, enjoy increasing commercial importance by reason of their large storage capacity in terms of weight and volume. Heretofore, however, their use in some fields has been limited because of the known capacity of silver electrodes to discharge at two potential levels, i.e. the argentous level and the argentic or "peroxide" level.

A single-potential electrode system is often desirable since electron tubes and similar circuit elements function best when operating at a predetermined input voltage. When silver electrodes discharging at two levels have been used as current sources, it has been necessary to design compromise circuits and equipment to accommodate the operational equipment to the change in voltage. It should be noted, parenthetically, that at low rates almost 40% of the capacity of the cell may be delivered at the argentic potential level. The actual mechanism of this two-level-discharge phenomenon is not completely understood.

It is an object of this invention to provide silver-oxide electrodes that discharge at constant voltage.

It is another object of this invention to provide a treatment for oxidized silver electrodes to control their voltage so that such electrodes will discharge only at the argentous-oxide potential even when initially charged to the argentic level.

It is a further object of this invention to provide silver electrodes capable of discharging at the argentous level with an apparent capacity higher than that theoretically inherent in electrodes charged to such level.

The present invention is based on the discovery that certain physical treatments will modify the silver-oxide electrode in such fashion that it will deliver its full-charge capacity at the argentous potential level only.

In accordance with this invention, fully charged silver electrodes are subjected to a treatment which consists in heating these electrodes, containing both argentous and argentic silver, at a temperature and for a period sufficient to convert their active material to a form in which it will discharge only at the argentous potential level and substantially without loss of electrochemical capacity.

The heat treatment preferably takes place in a fluid medium which will not react with the electrode material at the temperatures involved. Among the useful fluids there may be mentioned various non-reactive gases (e.g. air, oxygen, nitrogen, noble gases, steam) and liquids such as water and aqueous solutions containing few or no anions reactive with silver oxides (such as solutions of the alkali or alkaline-earth hydroxides). Gaseous media may be maintained at various pressures; under near-vacuum conditions a slight acceleration of the process has been observed, enabling the use of lower temperatures and/or shorter treatment times.

The temperature range at which this heat treatment is best carried out at atmospheric pressures has a lower limit of approximately 50° C. Below this temperature there appears to be no significant modification of the argentic oxide at least within reasonably short periods of exposure. The upper limit is the point (approximately 300° C.) at which argentous oxide completely decomposes to silver and oxygen according to the reaction $$2Ag_2O \rightarrow 4Ag + O_2$$

It is preferred, however, to perform the heat treatment nearer the lower limits of the temperature range set forth. Thus, in the range 90° to 110° C. electrodes exhibiting excellent dimensional stability and capacity maintenance have been prepared. Moreover, within this temperature range the time element is not unduly critical; the time necessary for complete modification of the oxide may be exceeded at least fourfold without noticeable loss of capacity. The competing reaction $2Ag_2O_2 \rightarrow 2Ag_2O + O_2$ takes place at a slower rate at the temperatures involved. At considerably higher temperatures, however, the duration of the treatment becomes critical and mechanical deformation (buckling) as well as capacity loss may be objectionable.

Figure 1:
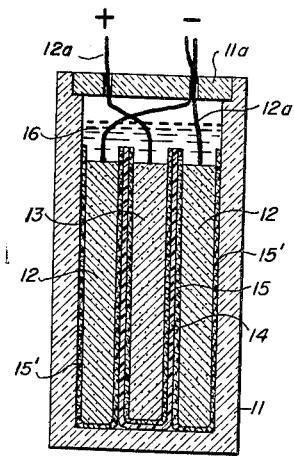
FIG. 1 illustrates, somewhat schematically, a representative cell with a positive electrode embodying the invention.

FIG. 1 shows a cell 10 having a casing 11 and a cover 11a, negative electrodes 12, and a positive silver electrode 13 made in accordance with this invention. Conductors 12a, 12b lead from the single positive and the two negative electrodes to respective terminals (not shown). Separator elements 14 and 15 consist of permeable and/or semi-permeable sheet materials, such as regenerated cellulose or paper, the entire assembly being permeated by an electrolyte 16. The active electrode material of negative plates 12 may consist of zinc or cadmium if rechargeability is desired, or of magnesium if this is not the case; other electro-negative materials may also be used. The electrolyte 16 preferably consists of a concentrated solution of potassium hydroxide although the use of other neutral or alkaline solutions is not excluded.

Figure 2:
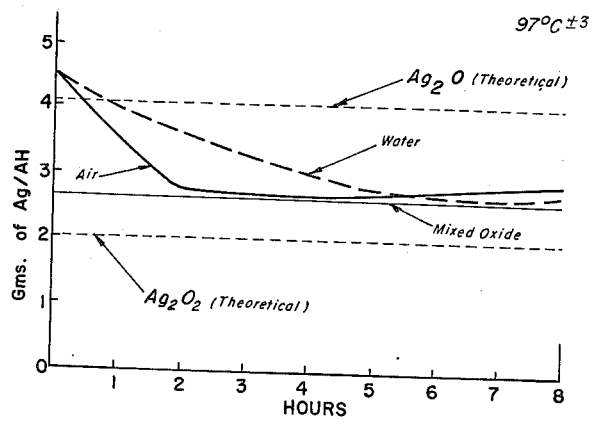
FIGS. 2 and 3 are performance graphs relating to such electrode.

FIG. 2 is a graph showing the time of treatment plotted against silver utilization at the argentous potential. The solid-line curve represents a treatment of the electrode in air and the interrupted line represents the electrode treated in water, both at 97° C.±3°. It will be noted that in each case the capacity, inversely represented by the silver utilization in grams of silver per ampere-hour, is substantially maintained even when the charged electrode remains subjected to the treatment for periods considerably longer than the minimum (two to four hours) required for complete conversion of the active material to oxides which will discharge at the argentous level.

Figure 3:
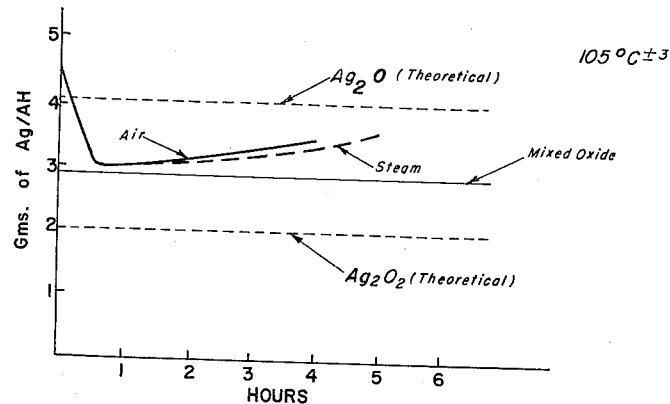

FIG. 3 is a graph showing the time of treatment plotted against silver utilization for a treatment temperature of 105° C.±3°. It will be noted that the capacity (or silver utilization) remains almost constant for a period which is somewhat less than in the preceding case, the minimum treatment time being here about half an hour for both dry and wet atmospheres (air and water vapor).

When the treatment bath is maintained at higher temperatures, the silver utilization in the electrode rises to the argentous-oxide value after very brief heating. At temperatures above 195° C. it appears that the conversion to argentous oxide proceeds very rapidly with loss of oxygen, according to the reaction $2Ag_2O_2 \rightarrow 2Ag_2O + O_2$. At these higher temperatures it has not been possible to obtain complete modification of the argentic oxide without some loss of capacity.

Figure 4:
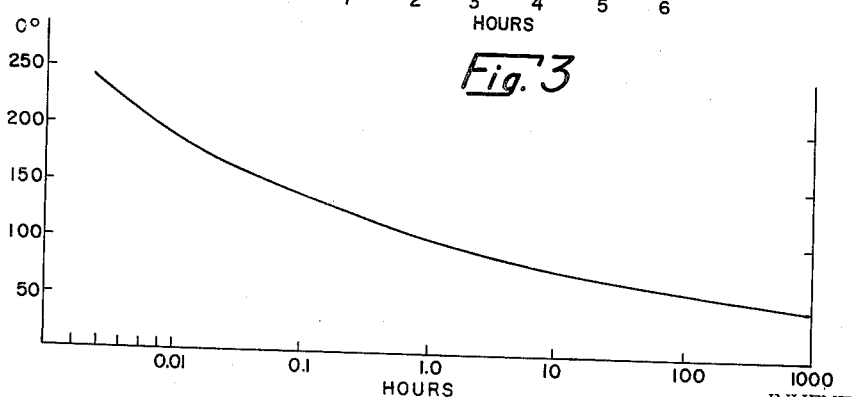
FIG. 4 is a graph showing the temperature/time relationship of the heat treatment according to this invention.

FIG. 4 is a plot of the temperature (degrees C.) vs. the time (hours) required for the complete conversion (by treatment in air) of the silver oxides in the electrode to oxides discharging at the argentous level only. It should be noted that the time is plotted on a logarithmic scale. The scale has been extended to encompass 1000 hours (more than one month) which time is required at 50° C. for the complete conversion of the active material. Testing of electrodes aged at room temperature for more than a year (approximately 9000 hours) indicates a shift toward the lower potential level occurring with a significant loss of total electrode capacity. For this reason it has been found expedient to limit the maximum duration of the heat treatment of this invention to considerably shorter periods, e.g. one to two months, satisfactory results being obtainable within such periods with treatment temperatures of approximately 50° C.

Theoretically, if all of the silver in an electrode could be converted to argentous oxide, the maximum possible utilization of its active material would be 4.026 grams of silver per ampere-hour. Conventional electrodes charged in the usual manner to the peroxide cut-off voltage, i.e. to the point where the electrode will not charge any more and begins to liberate oxygen, have an average utilization of 2.9 gm. (Ag)/AH compared with a theoretical one of 2.013 gm. (Ag)/AH for the argentic state. Electrodes treated in accordance with the invention have been found to have a capacity approaching or equaling that of conventional electrodes, not only in their virgin state but also during the first few cycles of a rechargeable battery. It has been found, in fact, that in the course of the initial rechargings of accumulators incorporating the novel electrodes there occurs an increase in capacity appreciably exceeding that observable with rechargeable batteries having untreated positive plates.

An apparent explanation consonant with present theory is that the oxygen in the freshly charged silver electrodes undergoes a lattice rearrangement to a lower-potential energy level which is accelerated by heating within the prescribed temperature range, i.e. upwards of 50° C. The decomposition reaction $2Ag_2O_2 \rightarrow Ag_2O + O_2$ is also accelerated by heat but follows a different time/temperature path so that it is possible to promote the desired lattice rearrangement and suppress decomposition by observing the operating conditions set forth.

EXAMPLE 1

Standardized silver electrodes weighing 2.10 gms. ±0.002 gm. prepared from sintered silver plates 0.04 cm. thick were charged against zinc-oxide cathodes in a constant-current circuit until the terminal voltage against zinc (2.1 volts) indicated completion of charge. The average gain in weight for each of the electrodes was 0.24 gm. The open-circuit voltage of these "raw" electrodes against zinc was 1.86 volts.

Next, these freshly charged silver-oxide electrodes were heated in a current of air until the voltage of the electrode against zinc, with a current drain of 0.026 amp./cm.², was 1.55 volts. The time for complete modification to the lower potential at the different temperatures is listed in the following table:

*Table 1*

| Temperature (0° C.): | Time (hours) |
|---|---|
| 50 | 650 |
| 75 | 36 |
| 90 | 5 |
| 95 | 1.7 |
| 100 | 1.0 |
| 105 | 0.5 |
| 140 | 0.1 |
| 250 | 0.003 |

EXAMPLE 2

Freshly charged electrodes according to Example 1 were heated in a current of nitrogen until the load voltage of the silver electrode against the zinc indicated complete conversion of the argentic oxide. The times required for such complete conversion matched very closely the times found for heating in air. There was no significant difference between these inert media insofar as their effect upon the present treatment was concerned.

EXAMPLE 3

Freshly charged electrodes according to Example 1 were immersed in a constant-temperature bath of water until the argentic voltage of the electrodes had completely disappeared. The time for complete removal of the argentic voltage at different temperatures is indicated in the following table:

*Table 2*

| Temperature (° C.): | Time (hours) |
|---|---|
| 90 | 8 |
| 95 | 2.5 |
| 100 | 1 |
| 105 | 0.6 |

EXAMPLE 4

Freshly charged electrodes according to Example 1 were heated in a partial vacuum (less than 10 mm. Hg). The times for complete conversion of the argentic oxide are listed in the following table:

*Table 3*

| Temperature (° C.): | Time (hours) |
|---|---|
| 90 | 4 |
| 95 | 1 |
| 100 | 0.7 |
| 105 | 0.4 |

EXAMPLE 5

Freshly charged electrodes were heated in boiling water for two hours, discharged against negative electrodes in an alkaline electrolyte, washed and recharged. The discharge curve indicated a silver utilization of approximately 2.9 gm. (Ag)/AH. The recharged electrode when discharged showed a silver utilization of 2.71 gm. (Ag)/AH.

We claim:

1. A process for modifying the discharge potential of an oxidized silver battery electrode containing argentic and argentous oxide comprising heating said oxidized electrode at temperatures of substantially at least 50° C. until the discharge potential of said electrode has been reduced to about the argentous oxide potential level.

2. A process for modifying the discharge potential of a galvanically oxidized silver battery electrode containing argentic and argentous oxide comprising heating said oxidized electrode at temperatures of substantially at least 50° C. until the discharge potential of said electrode has been reduced to about the argentous oxide potential level.

3. An oxidized silver battery electrode containing argentic and argentous oxide heat treated at temperatures of substantially at least 50° C. until the discharge potential of said electrode has been reduced to about the argentous oxide level.

4. A galvanically oxidized silver battery electrode containing argentic and argentous oxide heat treated at temperatures of substantially at least 50° C. until the discharge potential of said electrode has been reduced to the argentous oxide potential level when measured under the conditions wherein the unheated electrodes discharge at both an argentic oxide and argentous oxide level, said electrode having substantially the capacity of said electrode before heat treatment.

5. A process according to claim 1 wherein said electrode is heated to a temperature of in the range of from about 50° C. to 300° C.

6. A process according to claim 1 wherein said electrode is heated in a fluid medium.

7. A process according to claim 6 wherein said fluid medium is a gas.

8. A process according to claim 6 wherein the fluid medium is an aqueous liquid.

9. A process according to claim 1 wherein said electrode is heated for a time of substantially 1000 hours maximum at a temperature substantially as represented by the graph of FIG. 4.

10. A process according to claim 1 wherein said electrode is heated for a period of substantially half an hour minimum at a temperature ranging between substantially 90° and 110° C.

References Cited in the file of this patent
UNITED STATES PATENTS

| | | |
|---|---|---|
| 2,700,693 | Fischbach | Jan. 25, 1955 |
| 2,773,924 | Brill et al. | Dec. 11, 1956 |
| 2,849,519 | Freas et al. | Aug. 26, 1958 |
| 2,860,098 | Fahnoe | Nov. 11, 1958 |
| 2,886,620 | Barrett | May 12, 1959 |